United States Patent
Liu et al.

(10) Patent No.: US 12,043,011 B2
(45) Date of Patent: Jul. 23, 2024

(54) MANUFACTURING METHOD OF ELECTRONIC DEVICE

(71) Applicant: InnoLux Corporation, Miao-Li County (TW)

(72) Inventors: Cheng-Wei Liu, Miao-Li County (TW); Fang-Cheng Jhou, Miao-Li County (TW); Cheng-Chun Zhou, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 115 days.

(21) Appl. No.: 17/463,893

(22) Filed: Sep. 1, 2021

(65) Prior Publication Data
US 2022/0097346 A1 Mar. 31, 2022

(30) Foreign Application Priority Data
Sep. 30, 2020 (CN) .......................... 202011056463.1

(51) Int. Cl.
*B32B 17/00* (2006.01)
*B32B 1/00* (2024.01)
(Continued)

(52) U.S. Cl.
CPC .......... *B32B 17/10853* (2013.01); *B32B 1/00* (2013.01); *B32B 7/12* (2013.01); *B32B 17/10981* (2013.01); *B32B 37/003* (2013.01); *B32B 37/06* (2013.01); *B32B 37/1009* (2013.01); *B32B 38/162* (2013.01); *C03C 27/10* (2013.01); *B32B 2250/02* (2013.01); *B32B 2457/20* (2013.01)

(58) Field of Classification Search
CPC ....... B32B 17/10853; B32B 1/00; B32B 7/12; B32B 17/10981; B32B 37/003; B32B 37/06; B32B 37/1009; B32B 38/162; B32B 2250/02; B32B 2457/20; C03C 27/10
See application file for complete search history.

(56) References Cited

U.S. PATENT DOCUMENTS

| | | | |
|---|---|---|---|
| 2014/0356559 A1* | 12/2014 | Khachatryan | B32B 17/06 156/247 |
| 2019/0163003 A1* | 5/2019 | Kim | H05K 1/02 |
| 2021/0053336 A1* | 2/2021 | Kim | B32B 37/10 |

FOREIGN PATENT DOCUMENTS

| | | |
|---|---|---|
| CN | 102566841 A | 7/2012 |
| CN | 110103458 A | 8/2019 |
| TW | M558180 U | 4/2018 |

OTHER PUBLICATIONS

English machine translation of BE886278A to Baudin on May 21, 1981; 3 pages. (Year: 1981).*

(Continued)

*Primary Examiner* — Linda L Gray
(74) *Attorney, Agent, or Firm* — MUNCY, GEISSLER, OLDS & LOWE, P.C.

(57) ABSTRACT

An manufacturing method of an electronic device includes: providing a first substrate and a second substrate; attaching an adhesive member onto the first substrate; and performing a curve attaching step, so that the first substrate and the second substrate are attached to each other through the adhesive member to form a curved composite component, wherein the curve attaching step is performed at a temperature of 20 degrees Celsius to 160 degrees Celsius.

17 Claims, 6 Drawing Sheets

(51) Int. Cl.
    *B32B 7/00*     (2019.01)
    *B32B 7/12*     (2006.01)
    *B32B 17/10*     (2006.01)
    *B32B 37/00*     (2006.01)
    *B32B 37/06*     (2006.01)
    *B32B 37/10*     (2006.01)
    *B32B 38/00*     (2006.01)
    *B32B 38/16*     (2006.01)
    *C03C 27/00*     (2006.01)
    *C03C 27/10*     (2006.01)

(56) References Cited

OTHER PUBLICATIONS

English machine translation of CN111251694A to Wu on Jun. 9, 2020; 24 pages. (Year: 2020).*

* cited by examiner

MANUFACTURING METHOD OF ELECTRONIC DEVICE

CROSS REFERENCE TO RELATED APPLICATION

This application claims the benefits of the Chinese Patent Application Serial Number 202011056463.1, filed on Sep. 30, 2020, the subject matter of which is incorporated herein by reference.

BACKGROUND

1. Field

The present disclosure relates to a method of manufacturing an electronic device and, more particularly, to a method of manufacturing an electronic device having a curved composite component.

2. Description of Related Art

With the development of technology and changes in demand of consumers, curved sandwich glass has been developed on the market and applied to electronic devices. Typically, the curved glued glass is formed by curving glass through a high-temperature hot curving process, and then performing an attaching process. However, the temperature of the hot curving process is very high (approximately 600 degrees Celsius). At such a high temperature, the glass is prone to water ripples or pitting, resulting in low product yield rate. Therefore, it is desired to provide an improved manufacturing method to improve the product yield.

SUMMARY

The present disclosure provides a manufacturing method of an electronic device, which is characterized in including: providing a first substrate and a second substrate; attaching an adhesive member onto the first substrate; and performing a curve attaching step in which the first substrate and the second substrate are attached to each other through the adhesive member so as to form a curved composite component, wherein the curve attaching step is performed at a temperature of 20 degrees Celsius to 160 degrees Celsius.

Other novel features of the disclosure will become more apparent from the following detailed description when taken in conjunction with the accompanying drawings.

DETAILED DESCRIPTION OF EMBODIMENT

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that, in the specification and claims, unless otherwise specified, having "one" element is not limited to having a single said element, but one or more said elements may be provided. In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

The various aspects of the present disclosure can be fully understood by the following detailed description and the accompanying drawings. It should be noted that, according to standard practices in the industry, various features are not drawn to scale and are only used for illustrative purpose. In fact, it is possible to arbitrarily enlarge or reduce the size of the component to clearly show the features of the present disclosure. In addition, similar and/or corresponding reference numerals may be used in different embodiments for clear description of some embodiments, and do not represent any connection between the different embodiments and/or structures discussed.

In the entire specification and appended claims of the present disclosure, certain words are used to refer to specific components. Those skilled in the art should understand that electronic device manufacturers may refer to the same components by different names. The present disclosure does not intend to distinguish those components with the same function but different names. In the following description and claims, words such as "comprising", "including", and "having" are open type words, so they should be interpreted as meaning "including but not limited to . . . ". Therefore, when the terms "comprising", "including" and/or "having" are used in the description of the present disclosure, they specify the existence of corresponding features, regions, steps, operations and/or components, but do not exclude the existence of one or more corresponding features, regions, steps, operations and/or components.

The terms "about", "equal to", "equal" or "same", "substantially" or "approximately" are generally interpreted as being within 20% of a given value or range, or interpreted as being within 10%, 5%, 3%, 2%, 1%, or 0.5% of a given value or range.

In this disclosure, the thickness, length and width can be measured by using an optical microscope, and the thickness can be measured by the cross-sectional image in an electron microscope, but it is not limited thereto. In addition, there may be a certain error in any two values or directions used for comparison. If the first value is equal to the second value, it implies that there may be an error of about 10% between the first value and the second value. If the first direction is perpendicular to the second direction, the angle between the first direction and the second direction may be 80 to 100 degrees. If the first direction is parallel to the second direction, the angle between the first direction and the second direction may be 0 to 10 degrees.

It should be noted that the technical solutions provided by the different embodiments described hereinafter may be used interchangeably, combined or mixed to form another embodiment without violating the spirit of the present disclosure.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side.

When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

In addition, if a value is between a first value and a second value, the value may be the first value, the second value, or another value between the first value and the second value.

Figure 1A:
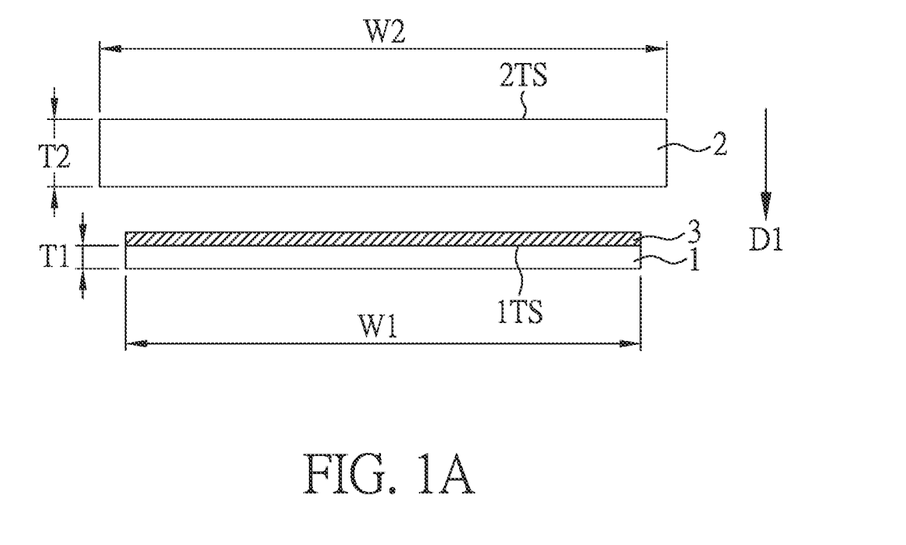
FIG. 1A and FIG. 1B schematically illustrate the manufacturing method of the curved composite component according to the present disclosure.
Figure 1B:
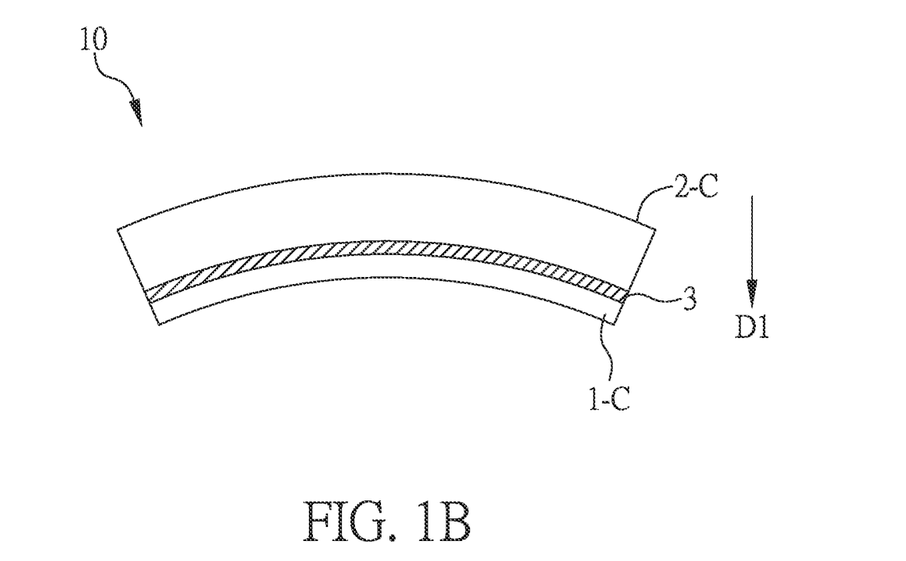

FIG. 1A and FIG. 1B schematically illustrate the manufacturing method of the curved composite component according to the present disclosure. As shown, the manufacturing method of the curved composite component according to the present disclosure is characterized in including: providing a first substrate 1 and a second substrate 2, wherein the first substrate 1 and the second substrate 2 are, for example, planar substrate, while the term "planar" can be defined as a radius of curvature being greater than or equal to 3000 millimeters (mm), but is not limited thereto; attaching an adhesive member 3 onto the first substrate 1; and performing a curve attaching step, so that the first substrate 1 and the second substrate 2 are attached to each other through the adhesive member 3 to form a curved composite component 10, wherein the curve attaching step is performed at a temperature of 20 degrees Celsius to 160 degrees Celsius ($20°$ C.$\leq$temperature$\leq 160°$ C.). Since the temperature at which the curve attaching step is performed is controlled within the range of 20 to 160 degrees Celsius in the present disclosure, it is able to prevent the glass from water ripples or pitting caused by high temperature, thereby improving the product yield.

As shown in FIG. 1B, when performing the curve attaching step, the first substrate 1 is formed to be a curved first substrate 1-C, and the second substrate 2 is formed to be a curved second substrate 2-C. The curved composite component 10 includes the curved first substrate 1-C, the curved second substrate 2-C, and the adhesive 3 member. The curved first substrate 1-C and the curved second substrate 2-C are attached to each other through the adhesive member 3. In other embodiments, the curved composite component 10 may include other layers or components as required.

In the present disclosure, the materials of the first substrate 1 and the second substrate 2 may include glass, quartz, sapphire, ceramic, polycarbonate (PC), polyimide (PI), polyethylene terephthalate (PET), other suitable substrate materials or a combination thereof, but not limited thereto. The first substrate 1 and the second substrate 2 may be made of the same or different materials. In some embodiments, the thickness T1 of the first substrate 1 and/or the thickness T2 of the second substrate 2 may be greater than or equal to 0.2 millimeters (mm) and smaller than or equal to 2 millimeters (0.2 mm$\leq$T1$\leq$2 mm; 0.2 mm$\leq$T2$\leq$2 mm), but not limited to this. In some embodiments, the thickness T1 and/or the thickness T2 may be greater than or equal to 0.3 mm and smaller than or equal to 1.5 mm (0.3 mm$\leq$T1$\leq$1.5 mm; 0.3 mm$\leq$T2$\leq$1.5 mm), but not limited thereto. In some embodiments, the thickness T1 and/or the thickness T2 may be greater than or equal to 0.3 mm and smaller than or equal to 1 mm (0.3 mm$\leq$T1$\leq$1 mm; 0.3 mm$\leq$T2$\leq$1 mm), but not limited thereto. In addition, the thickness T1 and/or the thickness T2 may be equal or unequal. In some embodiments, the thickness T1 may be smaller than the thickness T2. In another embodiment (not shown), the thickness T1 may be greater than the thickness T2. The thickness T1 and/or the thickness T2 may be defined as the average thickness of any three points measured relative to the central area of the device.

In the present disclosure (as shown in FIG. 1A), the area of the upper surface 1TS of the first substrate 1 and the area of the upper surface 2TS of the second substrate 2 are not particularly limited. In one embodiment, the area (or width W1) of the upper surface 1TS of the first substrate 1 and the area (or width W2) of the upper surface 2TS of the second substrate 2 may be the same or different, but not limited thereto. In one embodiment, the area (or width W1) of the upper surface 1TS of the first substrate 1 may be smaller than or equal to the area (or width W2) of the upper surface 2TS of the second substrate 2. In another embodiment (not shown), the area (or width W1) of the upper surface 1TS of the first substrate 1 may be greater than or equal to the area (or width W2) of the upper surface 2TS of the second substrate 2.

In some embodiments, the adhesive member 3 may include a thermosetting adhesive member or a light curing adhesive member, but not limited thereto. In some embodiments, the adhesive member 3 may comprise polyvinyl butyral (PVB), ethylene-vinyl acetate (EVA), thermoplastic polyurethane (TPU), optical clear adhesive (OCA), other suitable materials or a combination thereof, but not limited to this. In some embodiments, the curved composite component 10 may be a protective glass, but not limited thereto.

Figure 2:
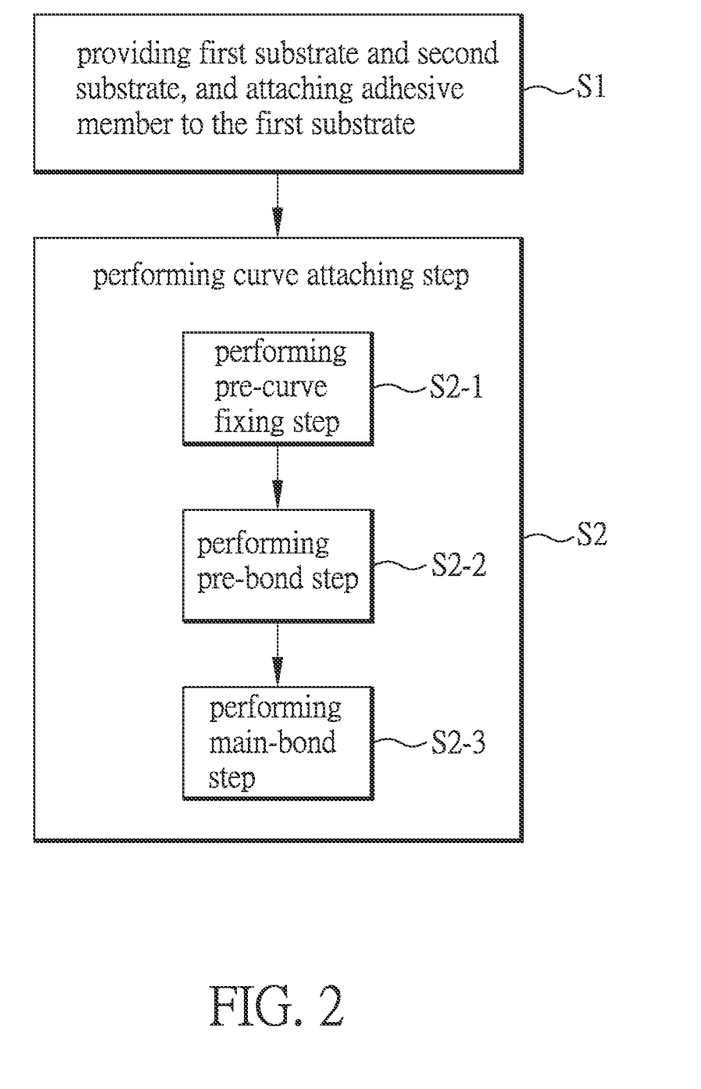
FIG. 2 is a flow chart of the manufacturing method of the curved composite component according to the present disclosure.

FIG. 2 is a flow chart of the manufacturing method of the curved composite component according to an embodiment of the present disclosure. In FIG. 2, first, as shown in the process S1, a first substrate 1 and a second substrate 2 are provided, and an adhesive member 3 is attached onto the first substrate 1. Next, a curve attaching step is performed in the process S2, so that the first substrate 1 and the second substrate 2 are attached to each other through the adhesive member 3 to form a curved composite component. The process S2 of curve attaching step includes: a sub-process S2-1, in which a pre-curve fixing step is performed to make the second substrate 2 in contact with the first substrate 1 attached with the adhesive member 3 for being pre-curved and fixed; a sub-process S2-2, in which a pre-bond step in which the adhesive member 3 is de-bubbled or edge-sealed; and a sub-process S2-3, in which a main-bond step is performed to heat or press the second substrate 2 and the first substrate 1 for being curved and fixed to each other through the adhesive member 3. After performing the above processes, the curved composite component 10 is formed.

In one embodiment of the present disclosure, the manufacturing method of the curved composite component 10 may include the process S1 to the process S2 as shown in FIG. 2, and the process S2 may include the sub-process S2-1 to the sub-process S2-3, but not limited to this. In other embodiments, other processes may be optionally added between the process S1 and process S2. In other embodiments, the process S2 may optionally include more sub-processes, and these sub-processes may be executed in any two of the aforementioned sub-process S2-1 to sub-process S2-3, or at least one of the aforementioned sub-process S2-1 to sub-process S2-3 may be optionally omitted. For example, the manufacturing method of the curved composite component 10 may not include the sub-process S2-2. After performing the pre-curve fixing step (sub-process S2-1), the main-bond step (sub-process S2-3) may be performed to form the curved composite component 10.

In the manufacturing method of the present disclosure, the curve attaching step further includes a pre-curve fixing step. In the pre-curve fixing step, the second substrate 2 and the first substrate 1 attached with the adhesive member 3 are curved and attached to each other by using, for example, an airbag 4 and a curved jig 6, so as to form a curved composite component 10. The pre-curve fixing step of the present disclosure will be described in detail below.

Figure 3A:
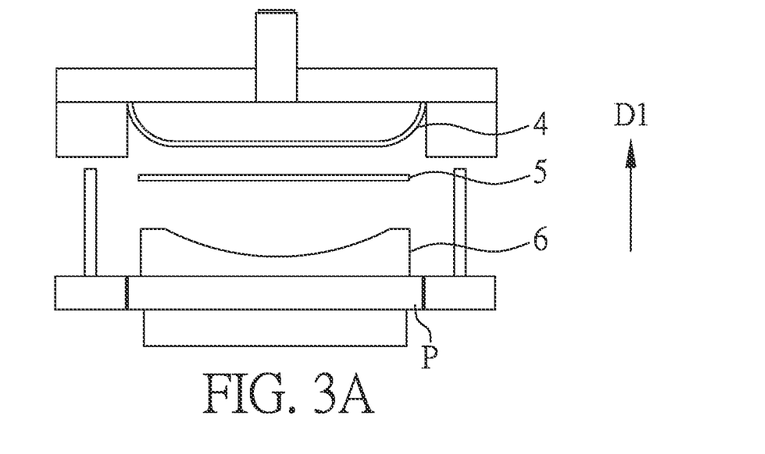
FIG. 3A to FIG. 3C schematically illustrate the pre-curve fixing step of the present disclosure.
Figure 3B:
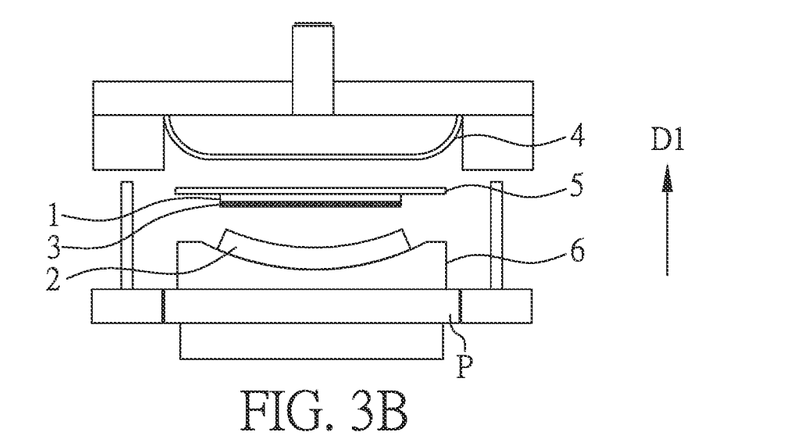
Figure 3C:
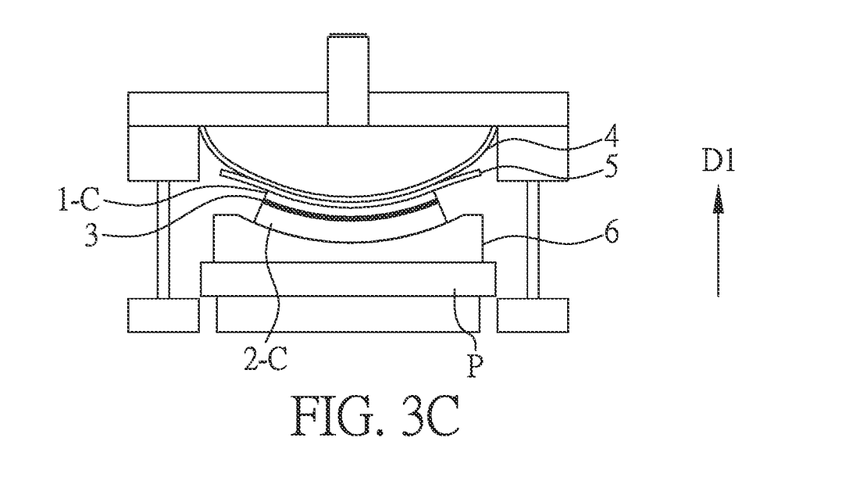

FIG. 3A to FIG. 3C schematically illustrate the pre-curve fixing step of the present disclosure. As shown in FIG. 3A, the curve attaching step of the present disclosure may include a pre-curve fixing step, which includes providing an airbag 4, a soft board 5 and a curved jig 6, wherein the soft board 5 is disposed between the airbag 4 and the curved jig 6, and the soft board 5 includes, for example, a mesh board or other suitable components. Then, as shown in FIG. 3B, the second substrate 2 is arranged on the curved jig 6, and the first substrate 1 attached with the adhesive member 3 is fixed on the soft board 5, wherein the adhesive member 3 faces the second substrate 2 (that is, the first substrate 1 is adjacent to the soft board 5). In one embodiment, the second substrate 2 is fixedly arranged on the curved jig 6 through a vacuum suction method or other methods, but it is not limited to this. At this moment, through the vacuum suction method, the second substrate 2 is affected by the curved jig 6 and thus temporarily shaped according to the curvature of the curved jig 6. Because the temporarily shaped second substrate 2 is not curved by heating, the temporarily shaped second substrate 2 can be restored to a substantially planar second substrate 2 when the curved jig 6 is removed.

Then, as shown in FIG. 3C, the airbag 4 is inflated, so that the second substrate 2 is brought into contact with the first substrate 1 attached with the adhesive member 3 for being curved. In some embodiments, the curved jig 6 may be arranged on a mechanism platform P, and the mechanism platform P may be optionally lifted during the process of inflating the airbag 4, so as to make the second substrate 2 in contact with the first substrate 1 attached with the adhesive member 3 for being curved. When performing the pre-curve fixing step, the first substrate 1 is formed to be a curved first substrate 1-C, and the second substrate 2 is formed to be a curved second substrate 2-C, while the curved first substrate 1-C and the curved second substrates 2-C are attached to each other through the adhesive member 3. In the present disclosure, the pre-curve fixing step may be performed at room temperature, for example, at a temperature within the range of 20 degrees Celsius to 60 degrees Celsius (20° C.≤temperature≤60° C.), but it is not limited thereto.

Figure 4A:
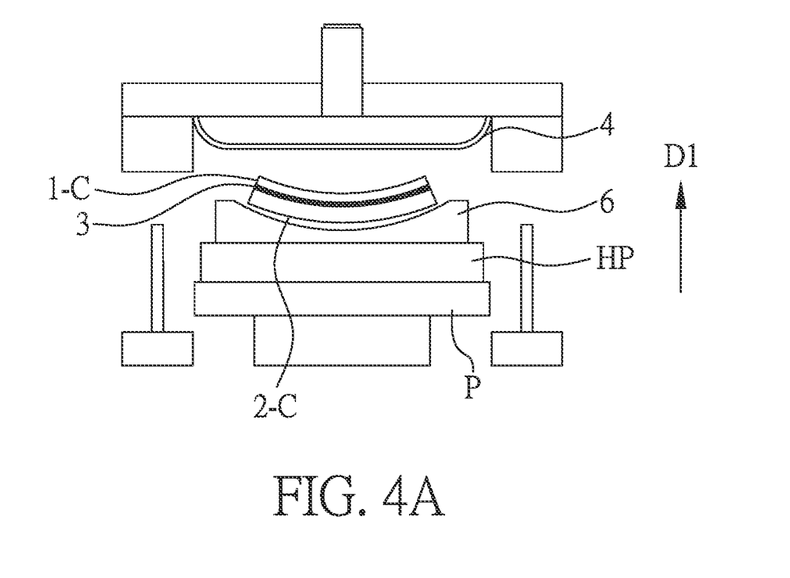
FIG. 4A and FIG. 4B schematically illustrate the bond step of the present disclosure.
Figure 4B:
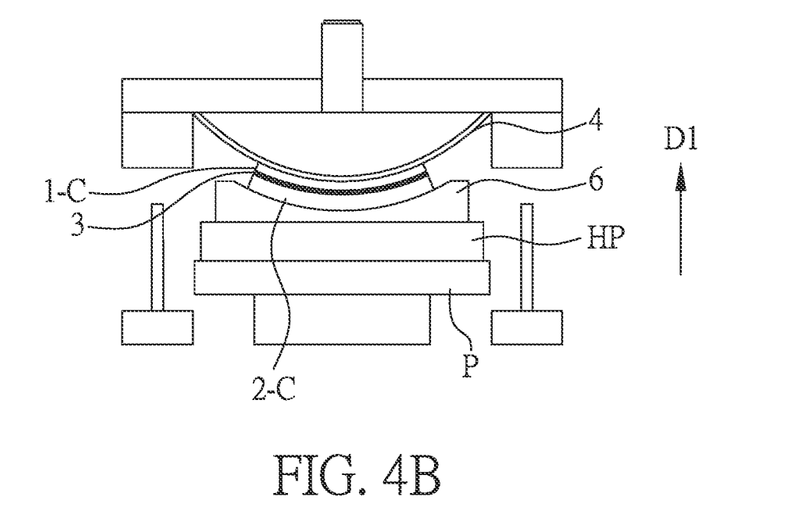

FIG. 4A and FIG. 4B schematically illustrate the bond step of the present disclosure. As shown in FIGS. 4A and 4B, the curve attaching step of the present disclosure may include a pre-bond step. The pre-bond step includes: de-bubbling or edge-sealing the adhesive member 3 by heating and/or pressing, but not limited to this. More specifically, as shown in FIG. 4A, a heater HP is arranged on the mechanism platform P, a curved jig 6 is arranged on the heater HP, and the curved first substrate 1-C and the curved second substrate 2-C that are pre-curved and fixed to each other through the adhesive member 3 are arranged on the curved jig 6, but not limited to this. Then, as shown in FIG. 4B, the curved jig 6 is heated by the heater HP, and the airbag 4 is inflated and pressurized, so that the adhesive member 3 is de-bubbled or edge-sealed to increase the adhesion between the curved first substrate 1-C and the curved second substrate 2-C, but it is not limited to this. In the present disclosure, the temperature of the pre-bond step may be 60 degrees Celsius to 150 degrees Celsius (60° C.≤temperature≤150° C.), for example, 60 degrees Celsius to 120 degrees Celsius (60° C.≤temperature≤120° C.) or 70 degrees Celsius to 100 degrees Celsius (70° C.≤temperature≤100° C.), but not limited to this. In some embodiments, the pre-curve fixing step or the pre-bond step is performed using the same apparatus or different apparatus.

The curve attaching step of the present disclosure may further include performing a main-bond step. In the main-bond step, the curved first substrate 1-C and the curved second substrate 2-C that are attached to each other through the adhesive member 3-C are placed in an autoclave for being heated to eliminate the attaching bubbles of the adhesive member 3 or increase the reaction of the adhesive member 3, so as to improve the attaching effect between the curved first substrate 1-C and the curved second substrate 2-C. The curved first substrate 1-C and the curved second substrate 2-C are attached to each other to form the curved composite component 10. The aforementioned increased reaction of the adhesive member 3 may cause a bonding reaction, such as a hydrogen bonding reaction, between the adhesive member 3 and the curved first substrate 1-C or the curved second substrate 2-C, but not limited thereto. The temperature of the main-bond step may be 80 degrees Celsius to 160 degrees Celsius (80° C.≤temperature≤160° C.), for example, 80 degrees Celsius to 140 degrees Celsius (80° C.≤temperature≤140° C.) or 80 degrees Celsius to 120 degrees Celsius (80° C.)≤temperature≤120° C.), but not limited to this. In some embodiments, the heating and/or pressing time of the main-bond step may be greater than the heating and/or pressing time of the pre-bond step. For example, the heating and/or pressurizing time of the pre-bond step may be about 0.5 minutes to 5 minutes (0.5 minutes≤time≤5 minutes), but it is not limited thereto. For example, the heating and/or pressurizing time of the main-bond step may be about 5 minutes to 40 minutes (5 minutes≤time≤40 minutes), but it is not limited thereto. The heating and/or pressing time or parameters of the pre-bond step or the main-bond step can be adjusted according to the adhesive characteristics of the adhesive member 3 or the materials of the first substrate and/or the second substrate to be bonded.

The manufacturing method of the present disclosure may further include other steps to improve the reliability or product effect of the curved composite component 10. In one embodiment, the manufacturing method may further include: cleaning the surface of the first substrate 1 and/or the surface of the second substrate 2 before performing the curve attaching step. In detail, the surface of the first substrate 1 and/or the surface of the second substrate 2 may be cleaned by an ion cleaning apparatus to improve the bonding effect between the adhesive member 3 and the first substrate 1 or the second substrate 2. In another embodiment (not shown), the manufacturing method may further include: performing an edging or polishing step on the curved composite component 10 to optimize the appearance of the curved composite component 10.

Figure 5A:
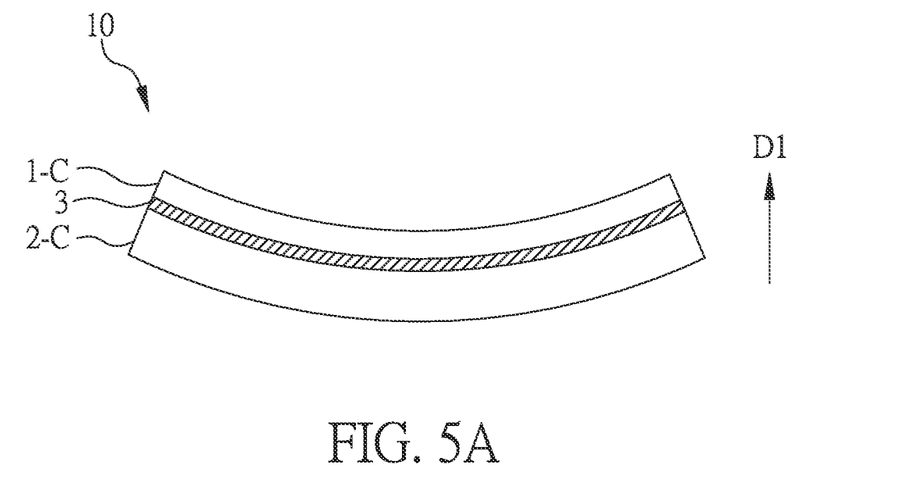
FIG. 5A is a schematic diagram of a curved composite component according to an embodiment of the present disclosure.
Figure 5B:
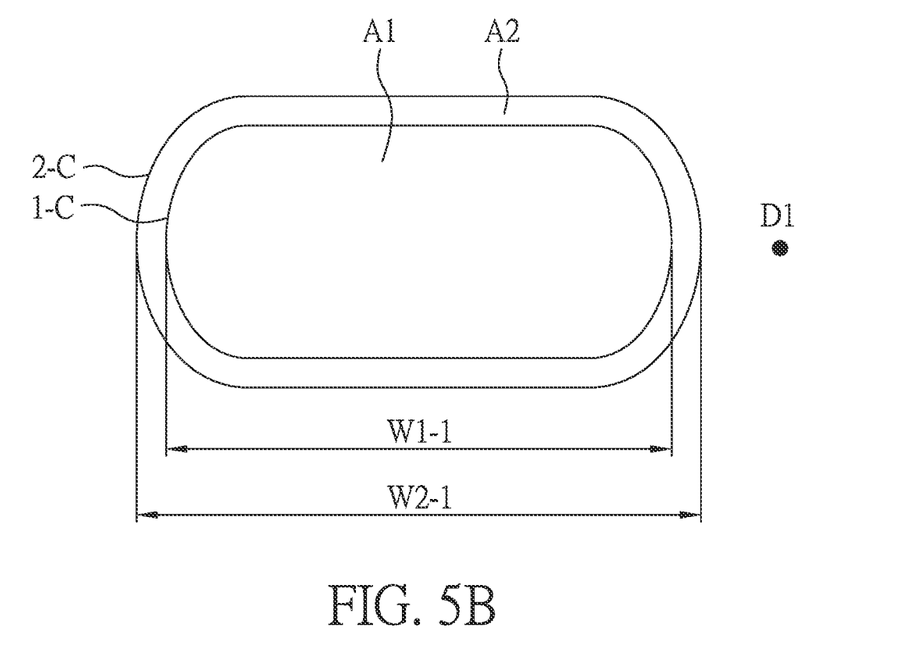
FIG. 5B is a top view of the curved composite component of FIG. 5A.

FIGS. 5A and 5B schematically illustrate the curved composite component 10 according to one embodiment of the present disclosure, wherein FIG. 5B is a top view of the curved composite component 10 of FIG. 5A. As shown in FIG. 5A, the curved composite component 10 includes a curved first substrate 1-C, a curved second substrate 2-C and an adhesive member 3, and the curved first substrate 1-C and the curved second substrate 2-C are attached to each other via the adhesive member 3, wherein the curvature of the curved first substrate 1-C is different from the curvature of the curved second substrate 2-C. In one embodiment (as shown in FIG. 5A), the curved first substrate 1-C is, for example, close to the viewer and, when viewing the curved composite component 10 in the top view direction D1, the cross-sectional structure of the curved composite component 10 is, for example, a concave in the middle. The curvature of the curved first substrate 1-C may be greater than the curvature of the curved second substrate 2-C, but not limited thereto. In other words, the curvature radius of the curved first substrate 1-C may be smaller than the curvature radius of the curved second substrate 2-C. In another embodiment (not shown), the curved first substrate 1-C is, for example, close to the viewer and, when viewing the curved composite component 10 in the top view direction D1, the cross-sectional structure of the curved composite component 10 is, for example, a convex in the middle and out of both sides, such that the curvature of the curved first substrate 1-C may be smaller than the curvature of the curved second substrate 2-C. In other words, the curvature radius of the curved first substrate 1-C may be greater than the curvature radius of the curved second substrate 2-C.

In some embodiments (as shown in FIG. 5B), when viewing the curved composite component 10 in the top view direction D1, the area A1 (or width W1-1) of the upper surface 1TS of the curved first substrate 1-C is different from the area A2 (or width W2-1) of the upper surface 2TS of the second substrate 2-C. For example (as shown in FIG. 5B), the area A1 (or width W1-1) of the upper surface 1TS of the curved first substrate 1-C may be smaller than the area A2 (or width W2-1) of the upper surface 2TS of the curved second substrate 2-C. In other embodiments (not shown), the area A1 (or width W1-1) of the upper surface 1TS of the curved first substrate 1-C may be greater than the area A2 (or width W2-1) of the upper surface 2TS of the curved second substrate 2-C. It should be noted that the aforementioned width W1, width W2, width W1-1, and width W2-1 are, for example, the measured maximum widths of the device.

In the present disclosure, the shapes of the first substrate 1 and the second substrate 2 are not particularly limited. For example, they may include rectangular, polygonal, circular, elliptical, fan-like or other irregular shapes, but e not limited thereto. In some embodiments, when viewed in the normal direction of the first substrate 1 or the second substrate 2 (such as the top view direction D1), the shape of the first substrate 1 or the second substrate 2 is non-rectangular, and thus, the formed curved composite component 10 has arc-shaped sides.

Since the curved composite component 10 of the present disclosure has not undergone a hot curving process, when the curved composite component 10 of the present disclosure is restored to a planar composite component (the adhesive member is still adhered in between the first substrate and the second substrate) through an autoclave process, the stress value of the planar composite component measured by using a stress meter may be approximately 0, but it is not limited to this. In detail, by taking a substrate curved to have a curved surface with a curvature radius of 1800 millimeters (mm) through the curving method of the present disclosure as an example, when the thickness of the substrate is designed to be 0.4 mm or 0.7 mm, the curved substrate (which may be regarded as the curved first substrate 1-C or the curved second substrate 2-C) is provided with internal stress of about 8.26 Mpa or 14.45 Mpa, but not limited to this. However, when the curved composite component 10 formed by the method of the present disclosure is restored to a planar composite component through the autoclave process, the stress value of the planar composite component is approximately zero. On the contrary, by taking a substrate that is curved to have a curved surface with a curvature radius of 1800 mm through a hot curving process as an example, when the thickness of the substrate is designed to be 0.4 mm or 0.7 mm, the internal stress in the curved substrate is about 0 MPa. However, when the curved composite component formed by the hot curving process is restored to a planar composite component through the autoclave process, the stress value is much greater than 0 Mpa, and the stress value may vary according to the thickness of the substrate. For example, after a substrate that has been curved through a hot curving process is restored to a planar substrate, the internal stress value in the planar substrate is approximately 8.26 Mpa and 14.45 Mpa depending on the thickness of the substrate being 0.4 mm or 0.7 mm. Because the planar composite component is formed by, for example, two substrates, the stress value of the planar composite component is approximately the sum of the respective stress values of the two substrates, but it is not limited to this. The aforementioned "restored planar composite component" is not limited to the autoclave process, and other suitable methods may be used to restore the composite component to be a planar one.

Figure 6:
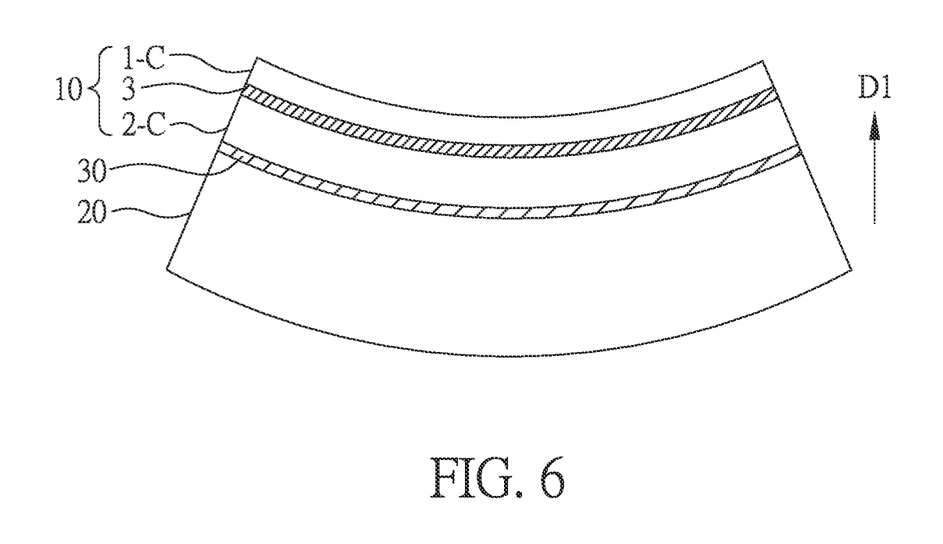
FIG. 6 is a schematic diagram of the electronic device according to the present disclosure.

FIG. 6 is a schematic diagram of the electronic device according to the present disclosure. As shown in FIG. 6, the electronic device of the present disclosure includes a curved composite component 10; and a display panel 20 disposed opposite to the curved composite component 10. In some embodiments, after the curved composite component 10 is formed, an optical clear adhesive (OCA) 30 may be disposed between the display panel 20 and the curved composite component 10 to bond the display panel 20 and the curved composite component 10, but not limited to this. In the present disclosure, the display panel 20 may be a bendable or flexible display panel, which is assembled with the curved composite component 10 to form a bendable or flexible electronic device, but it is not limited thereto. In this embodiment, the curved second substrate 2-C may be disposed between the curved first substrate 1-C and the display panel 20, but not limited to this. The curved composite component 10 may be used as a protective substrate. When the electronic device is impacted by an external force, causing the curved composite component 10 to be broken, the broken curved composite element 10 can still maintain its structural strength due to the adhesive member 3 sandwiched therein, which reduces injury to the user and improve safety.

In the present disclosure, the electronic device may include, for example, a display device, a light-emitting device, a touch display device, an antenna device, or a combination thereof, but is not limited thereto. The electronic device may include, for example, liquid crystal, light-emitting diode, fluorescence, phosphor, other suitable display media, or a combination thereof, but the present disclosure is not limited thereto. The light-emitting diode may include, for example, an organic light emitting diode (OLED), a sub-millimeter light emitting diode (mini LED), a micro light emitting diode (micro LED), or a quantum dot (QD) light emitting diode (for example, QLED, QDLED). Furthermore, the display device may be applied to any electronic device known in the art that needs a display screen for displaying images, such as monitors, mobile phones, laptops, car monitors, video cameras, cameras, music players, mobile navigation devices, televisions, etc.

In summary, by controlling the temperature of the curve attaching step in the range of about 20 degrees Celsius to 160 degrees Celsius, the present disclosure is able to reduce defects such as water ripples or pitting of the glass so as to improve the yield rate, and the safety of the manufactured electronic device can be improves. The aforementioned specific embodiments should be construed as merely illustrative, and should not restrict the rest of the present disclosure in any way, while the features between different embodiments can be mixed and used as long as they do not conflict with each other.

What is claimed is:

1. A manufacturing method of an electronic device, comprising:
   providing a first substrate and a second substrate;
   attaching an adhesive member onto the first substrate; and
   performing a curve attaching step, so that the first substrate and the second substrate are attached to each other through the adhesive member, thereby forming a curved composite component,
   wherein the curve attaching step is performed at a temperature of 20 degrees Celsius to 160 degrees Celsius,
   wherein the curve attaching step includes:
      performing a pre-curve fixing step, including:
         providing an airbag, a board and a curved jig, wherein the board is arranged between the airbag and the curved jig;
         arranging the second substrate on the curved jig;
         fixing the first substrate attached with the adhesive member to the board, wherein the adhesive member faces the second substrate; and
         inflating the airbag to bring the second substrate into contact with the adhesive member attached to the first substrate.

2. The manufacturing method of claim 1, wherein the curved composite component is a protective glass.

3. The manufacturing method of claim 1, wherein a thickness of the first substrate or a thickness of the second substrate is greater than or equal to 0.2 mm and smaller than or equal to 2 mm.

4. The manufacturing method of claim 1, wherein the adhesive member includes polyvinyl butyral, ethylene-vinyl acetate, thermoplastic polyurethane, or optical clear adhesive.

5. The manufacturing method of claim 1, wherein the step of arranging the second substrate on the curved jig includes fixing the second substrate on the curved jig by vacuum suction.

6. The manufacturing method of claim 1, wherein the curve attaching step includes:
   performing the pre-curve fixing step to bring the second substrate and the adhesive member attached to the first substrate into contact with each other for being pre-curved and fixed;
   performing a pre-bond step to de-bubble or edge-seal the adhesive member; and
   performing a main-bond step to curve and fix the second substrate and the first substrate through the adhesive member by heating or pressing.

7. The manufacturing method of claim 1, further comprising: performing an edging step or a polishing step on the curved composite component.

8. The manufacturing method of claim 1, wherein, after the curved composite component is formed, an optical clear adhesive is disposed between a display panel and the curved composite component so as to bond the curved composite component to the display panel.

9. The manufacturing method of claim 6, wherein, in the pre-curve fixing step, the curved jig is arranged on a mechanism platform, and the mechanism platform is lifted when inflating the airbag, so as to make the second substrate in contact with the adhesive member attached to the first substrate for being curved.

10. The manufacturing method of claim 1, wherein the pre-curve fixing step is performed at a temperature of 20 degrees Celsius to 60 degrees Celsius.

11. The manufacturing method of claim 9, wherein, in the pre-curve fixing step, the first substrate is formed to be a curved first substrate, and the second substrate is formed to be a curved second substrate, and the curved first substrate and the curved second substrate are attached to each other through the adhesive member.

12. The manufacturing method of claim 11, wherein, in the pre-bond step, the adhesive member is de-bubbled or edge-sealed by heating, pressing, or heating and pressing.

13. The manufacturing method of claim 6, wherein the pre-bond step is performed at a temperature of 60 degrees Celsius to 150 degrees Celsius.

14. The manufacturing method of claim 12, wherein, in the pre-bond step, a heater is arranged on the mechanism platform, the curved jig is arranged on the heater, the curved first substrate and the curved second substrate that are pre-curved and fixed to each other through the adhesive member are arranged on the curved jig, the curved jig is heated by the heater, and the airbag is inflated and pressurized, so that the adhesive member is de-bubbled or edge-sealed to increase the adhesion between the curved first substrate and the curved second substrate.

15. The manufacturing method of claim 11, wherein, in the main-bond step, the curved first substrate and the curved second substrate that are attached to each other through the adhesive member are placed in an autoclave for being heated to eliminate attaching bubbles of the adhesive member or increase reaction of the adhesive member, so as to improve an attaching effect between the curved first substrate and the curved second substrate.

16. The manufacturing method of claim 6, wherein the main-bond step is performed at a temperature of 80 degrees Celsius to 160 degrees Celsius.

17. The manufacturing method of claim 1, further comprising: before performing the curve attaching step, cleaning a surface of the first substrate, a surface of the second substrate, or surfaces of the first substrate and the second substrate.

* * * * *